United States Patent [19]

Kobayashi et al.

[11] Patent Number: 4,616,280

[45] Date of Patent: Oct. 7, 1986

[54] MECHANISM FOR ADJUSTING MAGNETIC HEAD

[75] Inventors: Hidehiro Kobayashi, Maebashi; Yutaka Fukuda, Gunma; Seiji Kamiya, Maebashi, all of Japan

[73] Assignee: Victor Company of Japan, Limited, Yokohama, Japan

[21] Appl. No.: 521,071

[22] Filed: Aug. 8, 1983

[30] Foreign Application Priority Data

Aug. 13, 1982 [JP] Japan .................. 57-122919[U]

[51] Int. Cl.⁴ .................................................. G11B 5/56
[52] U.S. Cl. ................................................... 360/109
[58] Field of Search .......................... 360/109, 90, 93

[56] References Cited

U.S. PATENT DOCUMENTS

| 3,502,820 | 3/1970 | Zenz | 360/109 |
| 3,649,773 | 3/1972 | Trammell . | |
| 4,086,638 | 4/1978 | Saito . | |

FOREIGN PATENT DOCUMENTS

| 2527139 | 12/1976 | Fed. Rep. of Germany . | |
| 2040099 | 8/1980 | United Kingdom . | |
| 2092808 | 8/1982 | United Kingdom . | |
| 627525 | 8/1978 | U.S.S.R. | 360/109 |

Primary Examiner—A. J. Heinz
Attorney, Agent, or Firm—Cushman, Darby & Cushman

[57] ABSTRACT

A mechanism for adjusting magnetic head azimuth comprises a base plate carrying a magnetic head thereon, and this base plate is supported at two portions close to its both ends above a chassis. At one of the two supporting portions is provided an adjusting screw and a coil spring so that the base plate is upwardly biased by the coil spring in the same manner as in conventional arrangements. At the other supporting portion is provided a stationary supporting leg interposed between the lower surface of the base plate and the chassis where the base plate is screwed to the supporting leg having a generally rectangular flat top end defined by two straight parallel edges. One of the straight edges corresponds to a radial line passing through a center screw hole made in the supporting leg, and these straight parallel edges are arranged to be parallel to the center axis of the magnetic head. Since the base plate is always in contact with at least one of the straight parallel edges, it is prevented from being inclined in undesirable directions. As a result, the plane of the base plate is always normal to the magnetic recording tape irrespective of the degree and direction of possible azimuth adjustment.

7 Claims, 14 Drawing Figures

MECHANISM FOR ADJUSTING MAGNETIC HEAD

BACKGROUND OF THE INVENTION

This invention relates generally to a mechanism for adjusting the azimuth of a magnetic head used in a tape recorder or the like.

Azimuth adjusting mechanisms are widely employed in magnetic head supporting mechanisms of tape recorders, players or the like used for recording and/or reproducing audio signals, digital data or the like so that the atitute of the head is corrected such that the head gap thereof has a predetermined angle, such as 90 degrees, with respect to the longitudinal direction of a track or tracks on a magnetic recording tape. The azimuth adjusting mechanisms are adjusted when manufacturing tape recorders or the like to remove variations in azimuth throughout a number of products. Furthermore, in some studio use tape recorders, azimuth adjustment is effected occationary for deriving maximum output from a reproduce head by making the azimuth thereof equal to that of a record head.

Some conventional azimuth adjusting mechanisms, however, require a relatively large number of parts, such as screws, coil springs or the like, and therefore, it is troublesome and time consuming to manufacture such mechanisms. Although some other conventional azimuth adjusting mechanism include less number of parts, they suffer from a problem that a base plate carrying a magnetic head thereon is apt to incline in undesirable directions when an adjusting screw is screwed or loosened. Namely, in such conventional mechansims, the base plate is apt to inline so that the plane of the base plate is not normal to the plane of the magenetic recording tape. Since the magnetic head is fixedly attached to the base plate, the tape-contact surface of the head cannot be in complete contact with the tape surface, deteriorating recording and/or reproducing effciency and high-frequency response. In the case that the tape-contact surface of the magnetic head is inclined to a great extent, magnetic recording/reproducing would be difficult with respect to some tracks in the case of a multitrack head. In this way such an undesirable inclination of the magnetic head may result in unstable recording and/or reproducing.

SUMMARY OF THE INVENTION

The present invention has been developed in order to remove the above-described drawbacks inherent to the conventional azimuth adjusting mechanisms.

It is, therefore, an object of the present invention to provide a new and useful azimuth adjusting mechanism with which the magnetic head does not incline in undesirable directions where the mechanism requires a small number of parts.

According to a feature of the present invention a top end of a supporting leg, on which a base plate carrying a magnetic head thereon is supported at its one end, has a rectangular shape having two straight parallel edges which are arranged to be paralled to the center axis of the magnetic head which axis is normal to the surface of a magnetic recording tape. The base plate is also supported at the other end by a coil spring and an adjusting screw. Clockwise or counterclockwise rotation of the adjusting screw causes the base plate to rotate about one of the straight parallel edges, and therefore, the base plate as well as the head thereon inclines or rotate within a plane parallel to the surface of the magnetic recording tape.

In accordance with the present invention there is provided a mechanism for adjusting the azimuth of a magnetic head, comprising: a base plate carrying the magnetic head thereon, the base plate having first and second holes at its right and left ends, the magenetic head being secured to the base plate between the first and second holes such that a center axis of the magnetic head, which should be normal to a plane of a magnetic recording medium, is normal to a longitudinal direction of the base plate; an adjusting screw inserted through the first or second hole of the base plate to be engaged with a screw hole made in a chassis, the adjusting screw being inserted through a coil spring which is positioned between the lower end of the base plate and the chassis so that the base plate is upwardly biased and; a stationary supporting leg secured to the chassis, and having a center screw hole, the stationary supporting leg having a flat top end defined between two straight parallel edges, one of the edges being positioned to pass through the center hole, the base plate being secured to the stationary supporting leg by means of a screw which is inserted through the second or first hole of the base plate to be engaged with the screw hole, the stationary supporting leg being secured to the chassis such that the straight parallel edges are parallel to a center axis of the magnetic head.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1A:
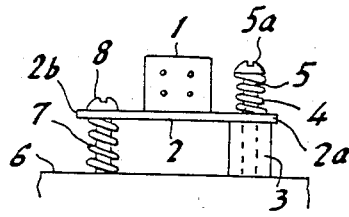
FIGS. 1A and 1B respectively show a front view and a side view of a conventional azimuth adjusting mechanism.
Figure 1B:
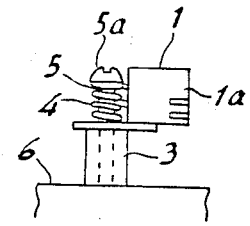

Prior to describing a preferred embodiment of the present invention, the above-mentioned conventional arrangements will be further described for a better understanding of the present invention.

FIGS. 1A, 1B, 2A and 2B show an example of a conventional azimuth adjusting mechanism. The mechanism has a base plate 2 carrying a magnetic head 1 thereon. The base plate 2 is supported above a chassis 6 at its both ends. Namely, one end of the base plate 2 is placed on a stationary member 3 or a supporting leg which is secured to the chassis 6 by a screw 5 and a coil spring 4. In detail, the coil spring 4 is interposed between an upper surface of the base plate 2 and a lower portion of the head 5a of the screw 5, where the screw 5 is inserted through a hole made at the right end of the base plate 2 and a center hole of the leg 3 to be screwed into a screw hole made in the chassis 6. The other end of the base plate 2 is supported by another screw 8, which is used as an adjusting screw, and a coil spring 7 such that the coil spring 7 is inserted between the chassis 6 and the lower surface of the base plate 2 with the adjusting screw 8 inserted through a hole made at the left of the base plate to be screwed into a screw hode made in the chassis 6.

Figure 2A:
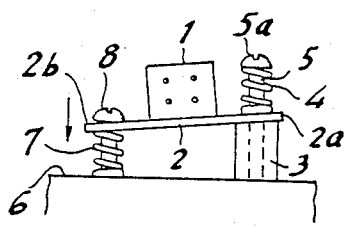
FIGS. 2A and 2B show the way of azimuth adjustment with the conventional mechanism of FIGS. 1A and 1B.
Figure 2B:
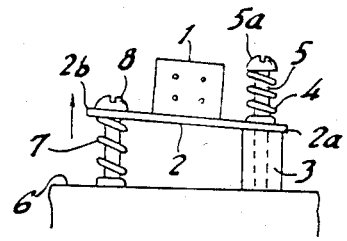

The conventional azimuth adjusting mechanism of FIGS. 1A to 2B operates as follows. When the azimuth adjusting screw 8 is screwed by a screw driver, the coil spring 8 is compressed so that the left end of the base plate 2 is lowered as shown in FIG. 2A. On the other hand, when the adjusting screw 8 is loosened, as shown in FIG. 2B, the left end of the base plate 2 is raised by force of the coil spring 7. Since the right end of the base plate 2 is biased toward the supporting leg 3 by means of the coil spring 4, the inclination or rotation of the base plate 2 causes the coil spring 4 to deform. As a result, the base plate 2 can be inclined as desired with the base plate 2 being always normal to the surface of the recording tape (not shown). However, this conventional mechanism has a drawback that the number of parts is relatively large. Furthermore, since both ends of the base plate 2 are supported by using the elasiticity of compression springs 5 and 7, the atitute of the base plate is readily changed undesirably when an external force is applied thereto.

FIGS. 3A to 3B, 4A, 4B, 5A and 5B show another conventional azimuth adjusting mechanisim, which is an improvement of the above-described one shown in FIGS. 1A, 1B, 2A and 2B.

Figure 3A:
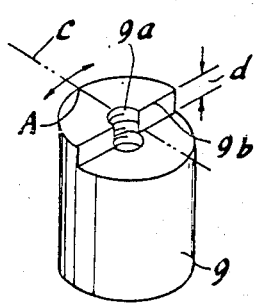
FIGS. 3A, 3B and 3C respectively show a perspective view of a supporting leg used in another conventional azimuth adjusting mechanism, a front view and a top plan view of the conventional azimuth adjusting mechanism having the supporting leg of FIG. 3A.
Figure 3B:
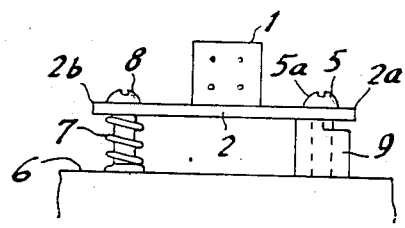
Figure 3C:
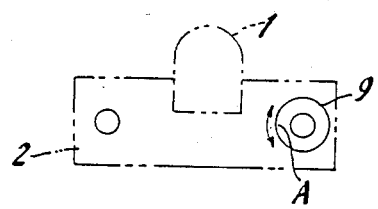
Figure 4A:
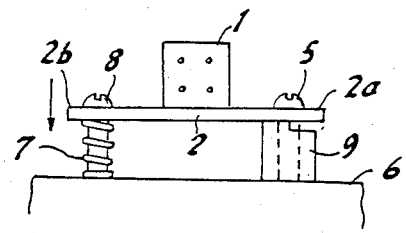
FIGS. 4A and 4B show the way of azimuth adjustment with the conventional azimuth adjusting mechanism of FIGS. 3B and 3C.
Figure 4B:
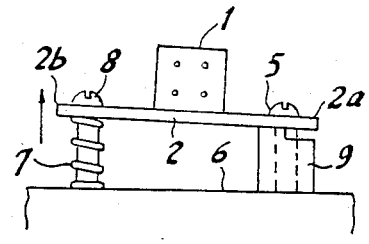

The improved arrangement differs from the above-mentioned arrangement in that the coil spring 4 is omitted and the top end of the supporting leg 3 (which is indicated at a reference 9 in FIGS. 3A to 5B) has a stepped structure. Namely, although the supporting leg 3 in the arrangement of FIGS. 1A to 2B has a cylindrical shape having a flat top surface or end, the supporting leg 9 in the improved arrangement has two semicircular surfaces which are stepped by a distance "d" at a radial line 9b passing through a center screw hole 9a as shown in FIG. 3A. This structure is employed so that the base plate 2 is readily inclined even if the base plate 2 is directly pressed toward the top end of the supporting leg 9 by the screw 5. In other words, the stepped top end of the supporting leg 9 is advantageous because an area contacting with the lower surface of the base plate 2 is reduced especially in a longitudinal direction of the base plate 2.

Figure 5A:
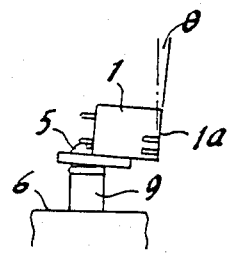
FIGS. 5A and 5B are side views of the azimuth adjusting mechanism of FIGS. 3B and 3C, showing undesirable inclination of the head magnetic head resulted from azimuth adjustment.
Figure 5B:
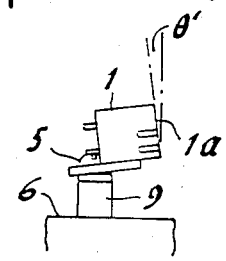

Although the improved azimuth adjusting mechanism of FIGS. 3A to 5B is superior than that of FIGS. 1A to 2B in that the number of required parts is less, and one end of the base plate 2 is substatially fixedly suppored so as to remove the influence of an external force, it suffers from a problem that the base plate 2 is apt to incline in undesirable directions as follows. As shown in FIG. 4A, when the azimuth adjustment is effected by screwing the adjusting screw 8, the base plate 2 is lowered at its left end to be slightly bent in the vicinity of the periphery of the supporting leg 9. At this time the base plate 2 is bent and/or inclined centering a point A positioned at the circumference of the semicircular top end of the supporting leg 9. Furthermore, in the case that the base plate 2 is relatively thick to be difficult to be bent, the lower surface of the base plate 2 is not in contact with the entire area of the top end of the supporting leg 9, but is in contact with the supporting leg 9 at the point A. Since this point A functions as a supporting point, the base plate 2 is bent, inclined or rotated about this point A as the adjusting screw 8 is screwed. However, this supporting point A is not necessarily positioned at a fixed point on a center radial line C (see FIG. 3A) which is parallel to the longitudinal direction of the base plate 2. Namely, the supporting point A is apt to move along the circumference of the semicircular top end as indicated by arrows depending on the irregularity in the flatness of the top end of the supporting leg 9 or the way of the loading on the base plate 2. As a result, the base plate 2 is apt to be inclined such that the plane of the base plate 2 is not normal to the surface of the magnetic recording tape as shown in FIGS. 5A and 5B. In FIGS. 5A and 5B, a dot-dash line indicates a direction parallel to an unshown recording tape which is to be in contact with the front surface of the magnetic head 1. An angle $\theta$ or $\theta''$ made between the front surface of the magnetic head 1 and the surface of the recording tape results in incomplete contact of the magnetic head 1 with the tape, which may result in deteriration in recording and/or reproducing efficiency.

Figure 6A:
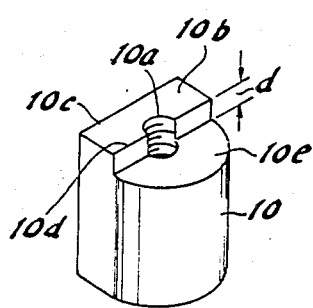
FIGS. 6A, 6B and 6C are respectively a perspective view a supporting leg used in an embodiment of the present invention, a top plan view and a side view of the embodiment.
Figure 6B:
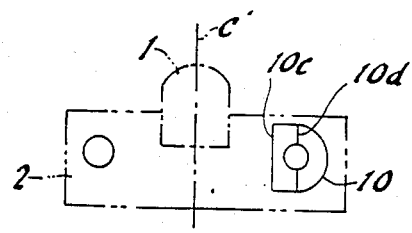
Figure 6C:
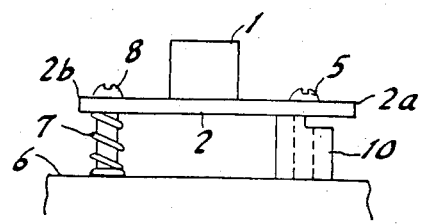

Referring now to FIGS. 6A to 6C, an embodiment of the present invention will be described. The embodiment differs from the conventional arrangement of FIGS. 3A to 5B in that the shape or the structure of the supporting leg 9 (which is indicated at a reference 10 in FIGS. 6A to 6C) is made different. Namely, the top end 10b of the supporting leg 10, which end will be in contact with the lower surface of the base plate 2, has a substantially rectangular shape rather than a semicircular shape as best seen in FIG. 6A. In detail, the top end 10b of the supporting leg 10 has straight parallel edges 10c and 10d. One edge 10d corresponds to a radial line passing through the center of the screw hole 10a made at the center of the supporting leg 10. Except for the above-mentioned rectangular top end 10b, the structure of the supporting leg 10 is similar to that of FIG. 3A, as a stepped structure is provided. The edges 10d and 10c will be respectively referred to as outer edge and inner edge since the edge 10d is closer to the very end of the right end of the base plate 2 than the edge 10c.

As best seen in FIG. 6A, although the supporting leg 10 has a rectangular top end 10b and a semicircular end 10e which is stepped down from the level of the rectangular top end 10b, such a stepped structure is not ncessarily needed. Namely, the semicircular upper end 10e of the supporting leg 10 positioned at the right of the rectangular flat top end 10b may have a slope structure to be connected to the flat top end 10b at the outer edge 10d without having a step. In this way each of the inner and outer edges 10c and 10d is not required to have a sharp edge angle. It is necessary, however, that the angle of each of the inner and outer edges 10c and 10d is small enough to allow the base plate 2 to be bent or rotated thereabout.

When assembling the parts of the azimuth adjusting mechansim of FIGS. 6B and 6C, the supporting leg 10 is oriented such that the straight parallel edges 10d and 10c are both normal to the longitudinal direction of the base plate 2. Since the magnetic head 1 is attached to the base plate 2 so that its center line or axis C' is normal to the longitudinal direction of the base plate 2, the outer and inner edges 10d and 10c become parallel to the center line C'. As a result, the center line C' is normal to the plane of the magnetic recording tape. As shown in FIG. 6B, the base plate 2 has two through-holes (no numerals) through which screws 5 and 8 are to be inserted. These through holes may be made such that a line passing through the center of these holes is normal to the center line C' of the magnetic head 1.

When the azimuth adjusting screw 8 is screwed so that the left end of the base plate 2 is lowered, the base plate 2 is supported at the inner edge in such a manner, that the straight inner edge is fully in contact with the lower surface of the base plate 2. Since the base plate 2 rotates or inclines about an axis corresponding to the inner edge, the base plate 2 is difficult to incline in other directions. Furthermore, when the azimuth adjusting screw 8 is loosened to raise the left end of the base plate 2 relative to the chassis 6, the lower surface of the base plate 2 is then supported on the outer edge 10d which is also a straight edge functioning as an axis of rotation of the base plate 2. Therefore, the base plate 2 is also difficult to rotate or incline in other directions.

The top end 10b of the supporting leg 10 is not necessarily rectangular. Namely, the flat top end 10b defined between the inner and outer edges 10c and 10d may have other shapes. The distance between the inner and outer edges 10c and 10d is preferably as small as possible in view of smooth rotation or inclination of the base plate 2. However, if the distance between the inner and outer edges 10c and 10d is extremely reduced so that the top end 10b is not flat anymore and is rather sharp like a ridge, it would be difficult to assemble the base plate 2 therewith. Furthermore, such an extremely narrow width or a sharp edge may damage the lower surface of the base plate 2 because the top end 10b of the supporting leg 10 is apt to cut into the base plate 2 when the screw 5 is tightened. When the distance between the inner and outer edges 10c and 10d is set to a value between 1 and 3 millimeters, such troubles do not occur while the base plate 2 is capable of smoothly rotating around the inner or outer edge 10c or 10d.

From the foregoing, it will be understood that azimuth adjustment can be effected stably according to the present invention since the base plate 2 carrying the magnetic head 1 thereon is always normal to the magnetic recording tape. Particularly, since the base plate 2 is always in contact with at least one of the straight parallel edges 10c and 10d, it is prevented from being inclined in undesirable directions. As a result, the plane of the base plate 2 is always normal to the magnetic recording tape irrespective of the degree and direction of possible azimuth adjustment. Especially, when the base plate is difficult to be bent, it is prevented from being undesirably inclined because the lower surface thereof is supported by at least one of the straight parallel edges 10c and 10d along the entire length of the straight edge.

In the above embodiment, the azimuth adjusting mechanism has been described to be attached to a chassis, which is usually a staionary member. Although this is the case in an open-reel tape recorder, in the case of a cassette tape recorder, the magnetic head has to be able to move back and forth relative to the cassette tape, and therefore, the azimuth adjusting mechanism including the magnetic head is mounted on a movable member. Namely, in the case of a cassette tape recorder, the chassis 6 does not correspond to the chassis of the entire tape recorder but to the movable member, which is usually called a head-carrying plate.

The above-described embodiment is just an example of the present invention, and therefore, it will be apparent for those skilled in the art that many modifications and variations may be made without departing from the spirit of the present invention.

What is claimed is:

1. A mechanism for adjusting the azimuth of a magnetic head, comprising:
   (a) an elongated base plate carrying said magnetic head thereon, said base plate having first and second holes at its right and left ends, said magnetic head being secured to said base plate between said first and second holes such that a center axis of said magnetic head, which extends in a direction normal to a plane of a magnetic recording medium, is normal to a longitudinal direction of said base plate;
   (b) an adjusting screw inserted through said first or second hole of said base plate to be engaged with a screw hole made in a chassis, said adjusting screw being inserted through a coil spring which is positioned between a lower side of said base plate and said chassis so that said base plate is upwardly biased and;
   (c) a stationary supporting leg secured to and extending away from a surface of said chassis and having a center screw hole, said stationary supporting leg having a flat top end remotely positioned relative to said chassis surface and defined between two straight parallel edges, said flat top end providing a supporting surface for one of the ends of said base plate and wherein said straight parallel edges act as axes about which said plate may alternatively rotate, one of said edges being positioned to pass through said center hole in a direction generally normal to the axis thereof, said base plate being secured to said stationary supporting leg by means of a screw which is inserted through said second or first hole of said base plate to be engaged with said screw hole, said stationary supporting leg being secured to said chassis such that said straight parallel edges are parallel to said center axis of said magnetic head.

2. A mechanism for adjusting the azimuth of a magnetic head as claimed in claim 1, wherein said first and second holes are made such that a line passing through said first and second holes is normal to said center axis of said magnetic head.

3. A mechanism for adjusting the azimuth of a magnetic head as claimed in claim 1, wherein said stationary supporting leg has a stepped structure to form said flat top end.

4. A mechanism for adjusting the azimuth of a magnetic head as claimed in claim 1, wherein said stationary supporting leg is generally semicylindrical except for said flat top end.

5. A mechanism for adjusting the azimuth of a magnetic head as claimed in claim 1, wherein said stationary supporting leg is positioned such that one of said straight parallel edges, which does not pass through said screw hole is located closer to said adjusting screw than the other straight edge.

6. A mechanism for adjusting the azimuth of a magnetic head as claimed in claim 1, wherein said flat top end of said stationary supporting leg is generally rectangular.

7. A mechanism for adjusting the azimuth of a magnetic head as claimed in claim 1, wherein said flat top end of said stationary supporting leg is substantially parallel to said chassis.

* * * * *